US011462988B1

(12) United States Patent
Tschirhart et al.

(10) Patent No.: US 11,462,988 B1
(45) Date of Patent: Oct. 4, 2022

(54) POWER SUPPLY SYSTEM AND CURRENT CONTROL BASED ON CONSUMPTION BY DYNAMIC LOADS

(71) Applicant: Infineon Technologies Austria AG, Villach (AT)

(72) Inventors: Darryl Tschirhart, Cambridge (CA); Kushal Kshirsagar, Warwick, RI (US); Danny Clavette, Greene, RI (US); Prasan Kasturi, Sharon, MA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/379,216

(22) Filed: Jul. 19, 2021

(51) Int. Cl.
*H02M 3/155* (2006.01)
*H02M 1/00* (2006.01)

(52) U.S. Cl.
CPC ......... *H02M 1/0048* (2021.05); *H02M 3/155* (2013.01)

(58) Field of Classification Search
None
See application file for complete search history.

(56) References Cited

U.S. PATENT DOCUMENTS

2022/0045628 A1\* 2/2022 Chen .................. H02M 7/5387

OTHER PUBLICATIONS

Das, et al., "A Bidirectional Wide Load Range Multiphase Buck/Boost Converter for Differential Power Processing", 2017, IEEE, pp. 1-7, Authorized licensed use limited to: Infineon Technologies AG. Downloaded on Jun. 16, 2021 at 20:03:23 UTC from IEEE Xplore.

\* cited by examiner

*Primary Examiner* — Jeffery S Zweizig
(74) *Attorney, Agent, or Firm* — Armis IP Law, LLC

(57) ABSTRACT

An apparatus includes a controller. The controller controls a first power supply to produce an output current supplied through a series connection of multiple dynamic loads powered at least in part by the output current. The controller further monitors current consumption by the multiple dynamic loads. Based on the monitored current consumption, the controller adjusts a magnitude of the output current from the power supply supplied through the series connection.

31 Claims, 12 Drawing Sheets

POWER SUPPLY SYSTEM AND CURRENT CONTROL BASED ON CONSUMPTION BY DYNAMIC LOADS

BACKGROUND

As transistor density of digital circuits continues to increase, so does the corresponding current consumed by respective loads incorporating those transistors. To address this issue, it has been proposed to connect processor cores in series. In such an instance, a Main voltage regulator (a.k.a., VR) provides power to the series stack of processor core loads. Both the main voltage regulator and a corresponding Local voltage regulator (associated with each load) are ground referenced, while higher indexed Local VRs are referenced to the output of the lower-indexed VR.

If desired, the Main voltage regulator and Local voltage regulators can be implemented as multi-phase VRs. A main power supply provides floating power to each Local VR.

During operation, the main VR provides a current to the series stack of dynamic loads that is equal to the average demand of the processor cores. The Local voltage regulators, in turn, provide extra current to power a respective dynamic load when that corresponding load consumes more power than power supplied by the main power supply via the main supply current provided through each dynamic load. In a perfectly balanced system, each local VR theoretically provides no current. However, power consumption by respective loads can change without notice. In such an instance, the voltage regulator assigned to monitor the respective dynamic load supplies additional power to the dynamic load so that the voltage across the dynamic load does not fall below a respective threshold value.

BRIEF DESCRIPTION

Implementation of clean energy (or green technology) is very important to reduce our impact as humans on the environment. In general, clean energy includes any evolving methods and materials to reduce an overall toxicity of energy consumption on the environment.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion.

Embodiments herein include novel ways of implementing control of one or more voltage regulators to a power a load.

More specifically, embodiments herein include an apparatus and/or system including a controller. The controller controls a first power supply to produce an output current supplied through a series connection of multiple dynamic loads powered at least in part by the output current. The controller further monitors current consumption by the multiple dynamic loads. Based on the monitored current consumption, the controller adjusts a magnitude of the output current from the power supply.

In further example embodiments, the controller adjusts the magnitude of the output current from the power supply based at least in part on an average current demanded amongst the multiple dynamic loads. In one embodiment, the controller controls multiple power converter phases in the power supply to collectively produce the magnitude of the output current to be the average current demanded/consumed amongst the multiple dynamic loads.

In further example embodiments, a respective voltage across each of the multiple dynamic loads is regulated via a corresponding power converter. The controller monitors a magnitude of corresponding current supplied by each of the corresponding power converters to a respective dynamic load. Based on the magnitudes of corresponding current, the controller derives an aggregate current value. The controller then uses the aggregate current value as a basis to produce a reference current setting to control a magnitude of current supplied by each of multiple power converter phases in the first power supply (first power converter).

Still further example embodiments herein include, via the controller, operating in a current control mode to produce the output current. Additionally, or alternatively, the controller can be configured to operate in a voltage control mode to produce the output current.

Yet further embodiments herein include, choosing a magnitude of a reference current value to control a buck/boost efficiency of respective power converters implemented to regulate respective voltages across the multiple dynamic loads.

Further embodiments herein include a voltage converter. In one embodiment, the voltage converter converts an input voltage into multiple level shifted supply voltages, each of which powers a corresponding power converter controlling a voltage across a respective dynamic load of the multiple dynamic loads.

The voltage converter can be configured in any suitable manner. For example, in one embodiment, the voltage converter (power converter) includes a DC transformer operative to produce the multiple level shifted supply voltages. The DC transformer can be implemented in any suitable topology, including hard-switched converter, resonant converter, switched-capacitor converter, etc. The power converter may or may not include a transformer. In one embodiment, the voltage converter (or power converter) is a switched capacitor level shifter power converter operative to produce the multiple supply voltages.

In still further example embodiments, the power management system as discussed herein includes a flyback voltage converter. The flyback voltage converter converts an input voltage into multiple level shifted supply voltages, each of which powers a corresponding power converter controlling a corresponding voltage across a respective dynamic load of the multiple dynamic loads.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: control a first power supply to produce an output current supplied through a series connection of multiple dynamic loads powered at least in part by the output current; monitor current consumption by each of the multiple dynamic loads; and adjust a magnitude of the output current from the power supply based on the detected current consumption.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
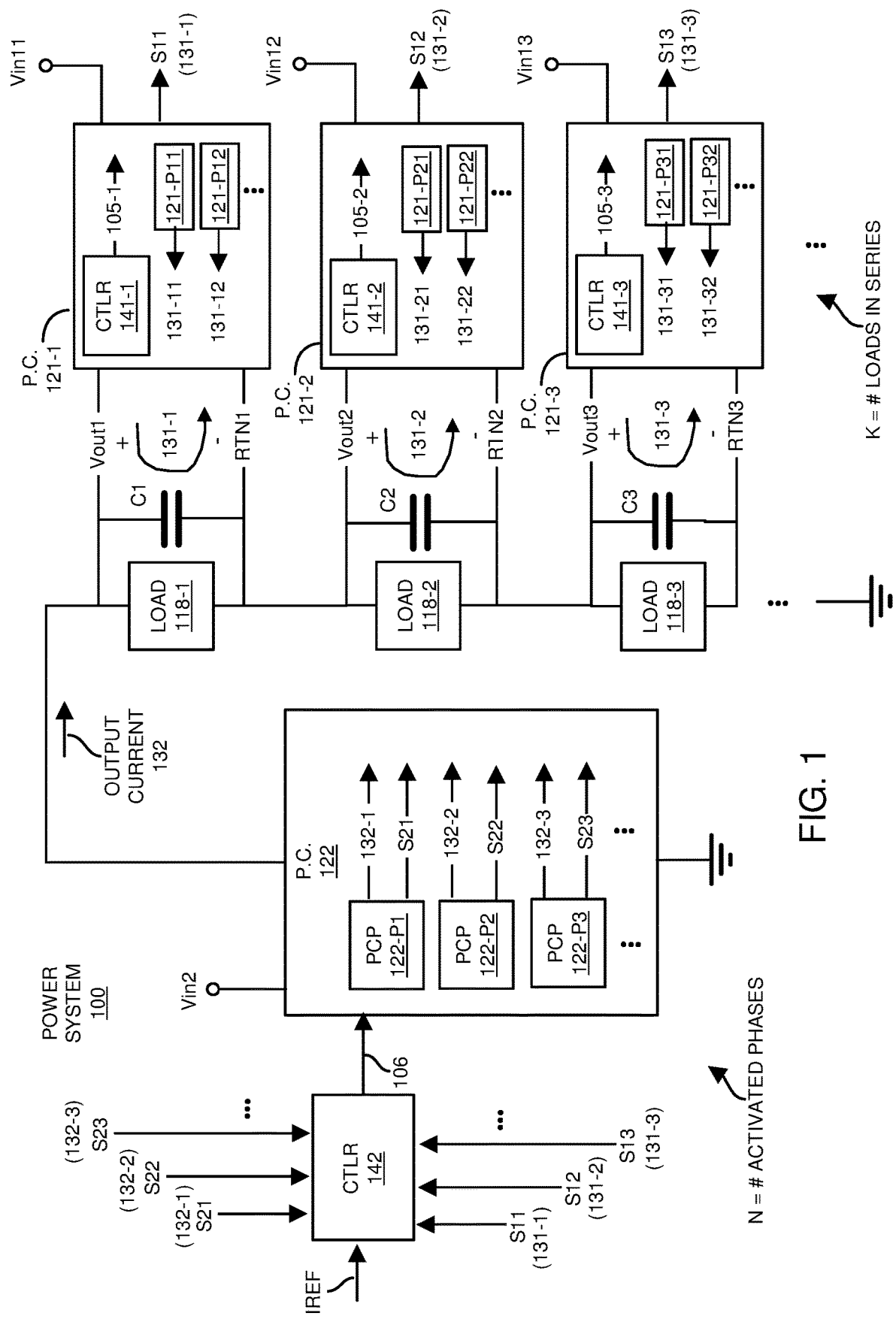
FIG. 1 is an example general diagram of a power supply including a primary power converter and multiple secondary power converters powering respective dynamic loads according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a controller disposed in a power supply. The controller controls a first power supply to produce an output current supplied through a series connection of multiple dynamic loads powered at least in part by the output current. The controller further monitors current consumption by the multiple dynamic loads. Based on the monitored current consumption, the controller adjusts a magnitude of the output current from the power supply supplied through the series connection.

In one embodiment, each of the dynamic loads is also individually powered at least in part via a respective power converter. The controller controls (such as regulates) a magnitude of the output current supplied through the series connection to be an average of current consumption by the dynamic loads. The respective power converters adjust an amount of current supplied to respective dynamic loads to maintain corresponding regulation of voltages across the dynamic loads.

Now, more specifically, FIG. 1 is an example general diagram of a power supply including a primary power supply and multiple power converters powering respective dynamic loads according to embodiments herein.

In this example embodiment, the power system 100 includes controller 142, power converter 122, multiple dynamic loads 118-1, 118-2, 118-3, etc., and/or capacitors C1, C2, C3, etc., and power converters 121-1, 121-2, 121-3, etc.

Output capacitor C1 (that stores voltage Vout1-RTN1) is disposed in parallel with dynamic load 118-1; output capacitor C2 (that stores voltage Vout2-RTN2) is disposed in parallel with dynamic load 118-2; output capacitor C3 (that stores Vout3-RTN3) is disposed in parallel with dynamic load 118-3; and so on.

In one embodiment, the power converters 121 are powered by respective input voltages. For example, power converter 121-1 is powered by input voltage Vin11; power converter 121-2 is powered by input voltage Vin12; power converter 121-1 is powered by input voltage Vin13; and so on.

Each of the power converters 121 (such as voltage regulators or other suitable entities) includes a respective controller. For example, power converter 121-1 includes controller 141-1; power converter 121-2 includes controller 141-2; power converter 121-3 includes controller 141-3; and so on.

Each of the power converters 121 includes one or more power converter phases.

For example, power converter 121-1 includes power converter phase 121-P11; power converter phase 121-P12, and so on.

Power converter 121-2 includes power converter phase 121-P21; power converter phase 121-P22, and so on.

Power converter 121-3 includes power converter phase 121-P23; power converter phase 121-P23, and so on.

A magnitude of the output current 131-1 (as indicated by the signal S11) from the power converter 121-1 is equal to a sum of the output current supplied by each of the power converter phase 121-P11, 121-P12, and so on. More specifically, output current 131-1 is a summation of: output current 131-11 from power converter phase 121-P11, output current 131-12 from power converter phase 121-P12, and so on.

A magnitude of the output current 131-2 (as indicated by the signal S12) from the power converter 121-2 is equal to a sum of the output current supplied by each of the power converter phase 121-P21, 121-P22, and so on. More specifically, output current 131-2 is a summation of: output current 131-21 from power converter phase 121-P21, output current 131-22 from power converter phase 121-P22, and so on.

A magnitude of the output current 131-3 (as indicated by the signal S13) from the power converter 121-3 is equal to a sum of the output current supplied by each of the power converter phase 121-P31, 121-P32, and so on. More specifically, output current 131-3 is a summation of: output current 131-31 from power converter phase 121-P31, output current 131-32 from power converter phase 121-P32, and so on.

In one embodiment, the power converter 122 is powered by input voltage Vin2 to produce the output current 132.

Note that the power converter 122 includes any number of power converter phases such as power converter phase 122-P1 that produces output current 132-1; power converter phase 122-P2 that produces output current 132-2; power converter phase 122-P3 that produces output current 132-3; and so on.

A magnitude of the output current 132 from the power converter 122 is equal to a sum of the output current 132-1, output current 132-2, output current 132-3, and so on.

Note that the power system 100 can include any number of dynamic loads and corresponding power converters 121 disposed in series.

Note further that any of the components as described herein can be implemented as hardware, software, or a combination of hardware and software. For example, each of the controllers 141 can be implemented as controller hardware, controller software, or combination of controller hardware and controller software; the controller 142 can be implemented as controller hardware, controller software, or combination of controller hardware and controller software; and so on.

As further shown, and as previously discussed, each of the dynamic loads is disposed in a series manner (such as stack) between the power converter 122 and corresponding ground reference. As previously discussed, the power converter 122 produces the output current 132 that passes through each of the dynamic loads 118-1, 118-2, 118-3, etc., to the ground reference.

In one embodiment, the power converter 122 produces a respective DC output voltage, resulting in generation of the output current 132.

In further example embodiments, as previously discussed, individual voltage sources supply power to the power converters 121. For example, the input voltage Vin11 powers the power converter 121-1; the input voltage Vin12 powers the power converter 121-2; the input voltage Vin13 powers the power converter 121-3; and so on.

Each of the dynamic loads 118 has its own local (floating) ground reference (labeled voltage RTN) that is independent of the ground associated with the power converter 122. In general, flow of the output current 132 through each of the dynamic loads 118 results in generation of a respective voltage across the dynamic load.

As a more specific example, flow of output current 132 (from the power converter 122) and output current 131-1 (from the power converter 121-1) through the dynamic load 118-1 results in a voltage of Vout1-RTN1 across the dynamic load 118-1; flow of output current 132 (from the power converter 122) and output current 131-2 (from the power converter 121-2) through the dynamic load 118-2 results in a voltage of Vout2-RTN2 across the dynamic load 118-2; flow of output current 132 (from the power converter 122) and output current 131-3 (from the power converter 121-3) through the dynamic load 118-3 results in a voltage of Vout3-RTN3 across the dynamic load 118-3; and so on.

Ideally, during balanced conditions, each of the dynamic loads 118 represents a substantially equal resistance (or impedance) such that each of the voltages Vout1-RTN1, Vout2-RTN2, Vout3-RTN3, etc., are substantially equal. However, the magnitude of the respective load 118 may vary such that the each of the dynamic loads consumes a different amount of current. In one embodiment, even though the dynamic loads 118 consume different magnitudes of current, each respective power converter 121 sinks or sources current through the load to maintain a respective magnitude of the voltage across the dynamic load.

Note that the dynamic loads 118 can be any suitable circuitry such as a stacked system with multiple printed circuit boards (each board being a dynamic load), multiple processors in the same semiconductor chip (each dynamic load being a processor core in the semiconductor chip), separate semiconductor chips, separate circuits, etc.

In further example embodiments, each of the dynamic loads 118 is a processor, processor system, circuitry, etc., that executes one or more instructions depending on a schedule generated by a scheduler or other suitable entity. The scheduler attempts to balance execution of the instructions such that each of the dynamic loads 118 consumes a substantially same amount of power for a given block of time and in which respective voltage drops across each dynamic loads are substantially equal.

It is noted that there may be variation of power consumption by each of the dynamic loads. In such an instance, the voltage across the dynamic loads may vary and result in an over-voltage condition or under voltage condition that could damage the one or more dynamic loads. As previously discussed, embodiments herein include implementing a respective power converter for each dynamic load to ensure that the voltage across each dynamic load is substantially constant even if one or more of the dynamic loads happen to consume more or less current than expected.

For example, in one embodiment, the controller 141-1 of the power converter 121-1 monitors a respective voltage (Vout1-RTN1) across the dynamic load 118-1. During operation, the power converter 121-1 supplies positive supplemental current 131-1 through the dynamic load 118-1 if the corresponding voltage is below a threshold level. Conversely, the power converter 121-1 supplies negative supplemental current through the dynamic load 118-1 if the corresponding voltage is above a threshold level. Without these current adjustments and prevention of the under-voltage and over-voltage conditions, the dynamic load 118-1 could be damaged or not meet performance targets.

The controller 141-2 of the power converter 121-2 monitors a respective voltage (Vout2-RTN2) across the dynamic load 118-2. During operation, the power converter 121-2 supplies positive supplemental current 131-2 through the dynamic load 118-2 if the corresponding voltage is below a threshold level. Conversely, the power converter 121-2 supplies negative supplemental current through the dynamic load 118-2 if the corresponding voltage is above a threshold level. Without these current adjustments and prevention of the under-voltage and over-voltage conditions, the dynamic load 118-2 could be damaged or not meet performance targets.

The controller 141-3 of the power converter 121-3 monitors a respective voltage (Vout3-RTN3) across the dynamic load 118-3. During operation, the power converter 121-3 supplies positive supplemental current 131-3 through the dynamic load 118-3 if the corresponding voltage is below a threshold level. Conversely, the power converter 121-3 supplies negative supplemental current through the dynamic load 118-3 if the corresponding voltage is above a threshold level. Without these current adjustments and prevention of the under-voltage and over-voltage conditions, the dynamic load 118-3 could be damaged or not meet performance targets.

Thus, each of the K power converters and corresponding controller operate in similar manner.

As further discussed herein, the controller 142 controls the power converter 122 (a.k.a., power supply) to produce an output current 132 supplied through a series connection of multiple dynamic loads 118 powered at least in part by the output current 132. The controller 142 further monitors current consumption by the multiple dynamic loads 118. Based on the monitored current consumption, the controller 142 adjusts a magnitude of the output current 132 from the power converter 122.

Figure 2:
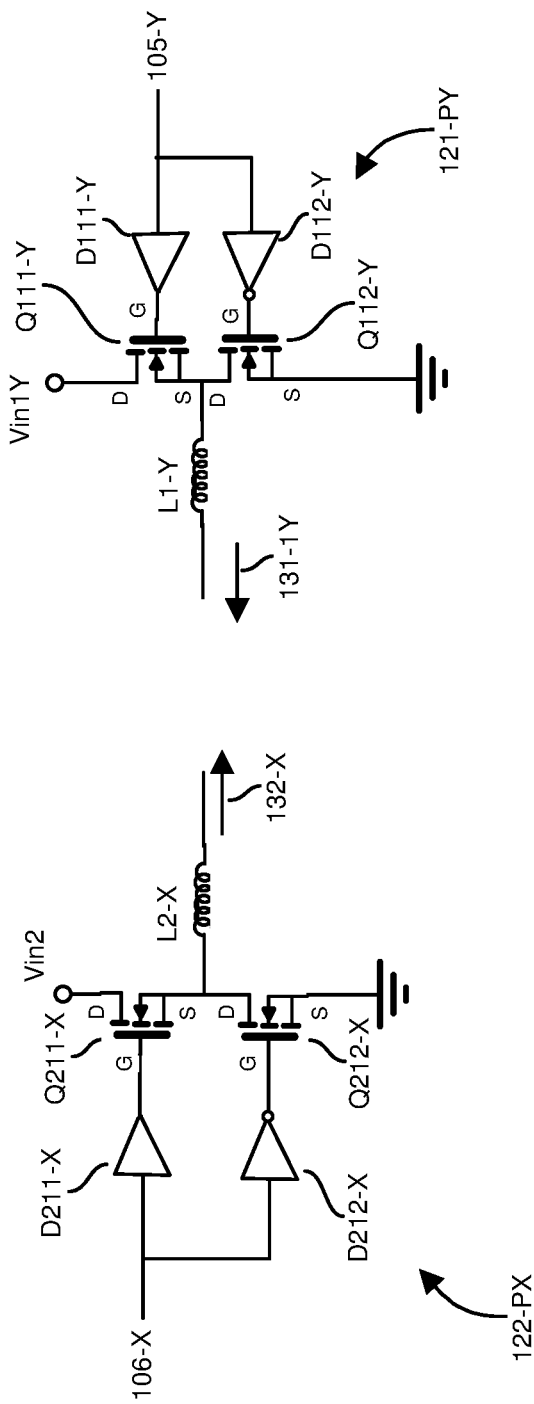
FIG. 2 is an example diagram illustrating implementation of different power converter phases according to embodiments herein.

FIG. 2 is an example diagram illustrating implementation of power converter phases in each respective power converter according to embodiments herein.

In this example embodiment, each power converter phase 121-PY (where Y is an integer value indicating a phase) in the respective power converter 121 includes an inductor L1-Y, switch Q111-Y, switch Q112-Y, driver D111-Y, and driver D112-Y. Note that any of the switches as discussed herein can be implemented in any suitable manner such as via MOSFETs, semiconductor material including GaN and SiC; and any power semiconductor including BJT, IGBT, JFET, etc.

The switch Q111-Y and switch Q112-Y are connected in series between the input voltage Vin1Y and a ground reference. For example, the drain (D) of switch Q111-Y is connected to receive the input voltage Vin1Y; the source (S) of switch Q111-Y is connected to the drain (D) of switch Q112-Y; the source (S) of switch Q112-Y is connected to the ground reference. Inductor L1-Y is connected to the source node of switch Q111-Y and drain node of switch Q112-Y.

Via the control signal 105-Y produced by the controller 141-Y, the controller 141-Y controls operation of the switches Q111-Y and Q112-Y in the respective power converter phase 121-PY. For example, activation of the high-side switch Q111-Y while the low-side switch Q112-Y is deactivated causes a magnitude of the current 131-1Y to increase during a respective control cycle; deactivation of the high-side switch Q111-Y while the low-side switch Q112-Y is activated causes a magnitude of the current 131-1Y to decrease during a respective control cycle. As discussed herein, the controller 141 varies the duty cycle of generating the control signal 105-Y to control a magnitude of the output current 131-1Y supplied from the inductor L1-Y to the dynamic load 118.

As further shown in this example embodiment, each of the power converter phases 122-PX in the power converter 122 (where X is an integer value indicating a phase) includes an inductor L2-X, switch Q211-X, switch Q212-X, driver D211-X, and driver D212-X. Note that any of the switches as discussed herein can be implemented in any suitable manner such as via MOSFETs, semiconductor material including GaN and SiC; and any power semiconductor including BJT, IGBT, JFET, etc.

The switch Q211-X and switch Q212-X are connected in series between the input voltage Vin2 and a ground reference. For example, the drain (D) of switch Q211-X is connected to receive the input voltage Vin2; the source (S) of switch Q211-X is connected to the drain (D) of switch Q212-X; the source (S) of switch Q212-X is connected to the ground reference. Inductor L2-X is connected to the source node of switch Q211-X and drain node of switch Q212-X.

Via the control signal 106-X produced by the controller 142, the controller 142 controls operation of the switches in the respective power converter phase 122-PX. For example, activation of the high-side switch Q211-X while the low-side switch Q212-X is deactivated causes a magnitude of the current 132-X to increase during a respective control cycle; deactivation of the high-side switch Q211-X while the low-side switch Q212-X is activated causes a magnitude of the current 132-X to decrease during a respective control cycle. As discussed herein, the controller 142 varies the duty cycle of generating the control signal 106-X to control a magnitude of the output current 132-X supplied to the dynamic load 118.

Note that the power converters as discussed herein can be any type of power converter. In one embodiment, one or more of the power converters such as power converter 122, power converter 121-1, power converter 121-2, etc., is implemented as a multi-phase synchronous buck converter. The respective controllers can be configured to activate any number of phases to produce the respective output current.

Figure 3:
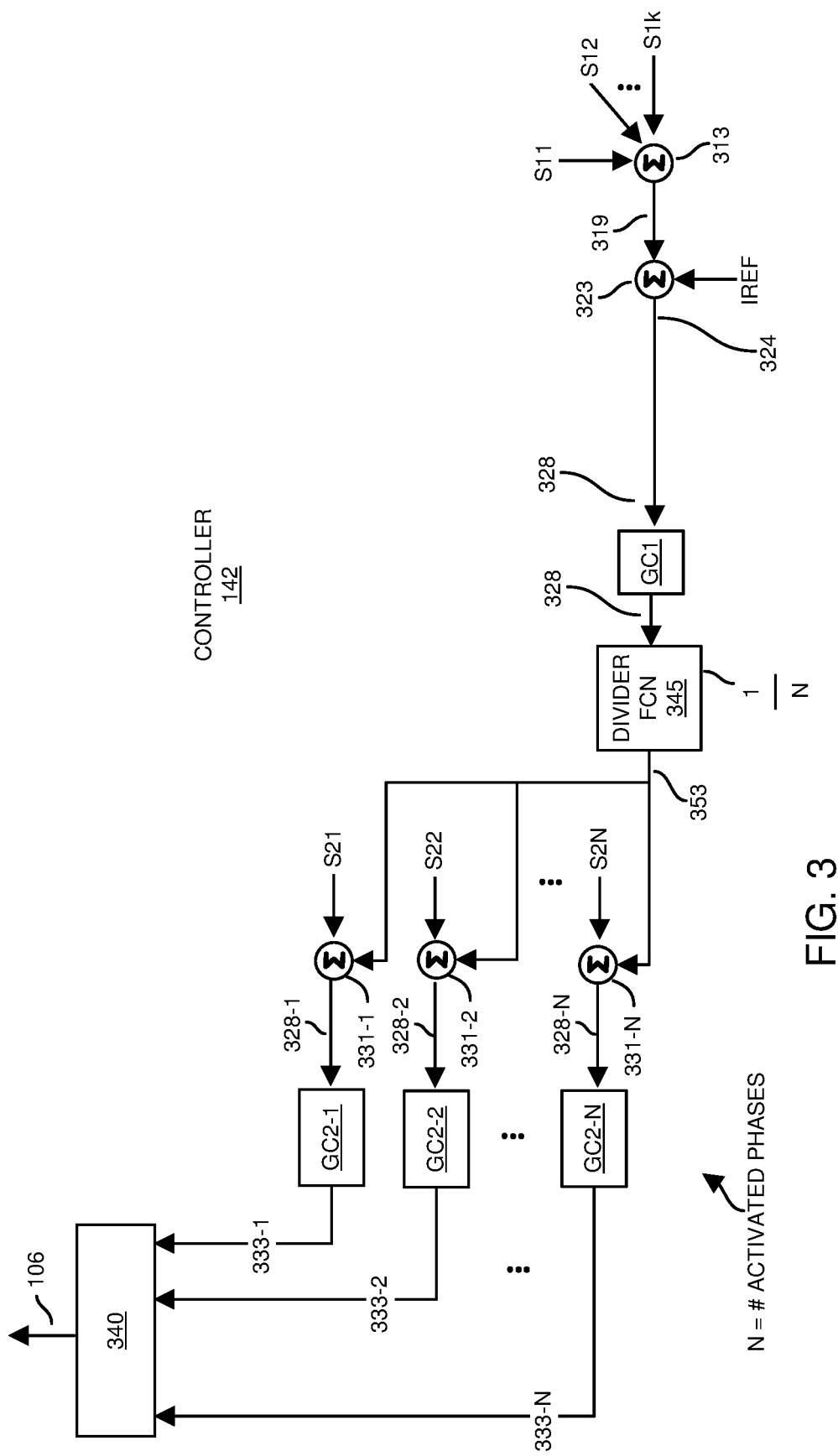
FIG. 3 is an example diagram illustrating implementation of an average current mode control loop in a main power system (primary power converter) according to embodiments herein.

FIG. 3 is an example diagram illustrating implementation of an average current mode control loop in a main power system according to embodiments herein.

In this example embodiment, the controller 142 provides control of the output current 132 based on multiple feedback signals including feedback signal S11 (magnitude of the output current 131-1), feedback signal S12 (magnitude of the output current 131-2), feedback signal S1K (magnitude of the output current 131-K). Additionally, the controller 142 provides control of the output current 132 based on feedback signals S21, S22, S23, etc., corresponding to output current 132-1, 132-2, 132-3, etc., supplied by the N activated power converter phases of the power converter 122.

More specifically, summer 313 sums a combination of the input signal S11 (representing the magnitude of the output current 131-1), input signal S12 (representing the magnitude of the output current 131-2), input signal S13 (representing the magnitude of the output current 131-3), . . . , input signal S1k (representing the magnitude of the output current 131-k).

The signal 319 produced by the summer 313 represents the summation of output current 131-1, output current, 131-2, output current 131-3, and so on.

Summer 323 sums signal 319 and reference current signal IREF to produce signal 324. In one embodiment, IREF=0 amps. Alternatively, IREF is set to a non-zero setting to control buck/boost operations of power converters (see FIG. 6) and provide better efficiency of supplying power to the dynamic loads 118.

Referring again to FIG. 3, via received signal 324, compensator function GC1 (such as a PID compensator) produces signal 328 representing a control setting corresponding to a magnitude of the output current 132; the control setting results in the sum of the output currents 131 to be zero. In other words, control operation as discussed herein results in the sum of signals S11, S12, S13, etc., (or signal 319) to be at or near zero.

As its name suggests, the divider function 345 divides the control signal 328 by a number of N activated phases in the power converter 122 to produce control setting 353, which is used as a basis to regulate a magnitude of output current from each of the power converter phases in the power converter phase 122.

For example, summer 331-1 generates the error current signal 328-1 based on a difference between the magnitude of the output current 132-1 as indicated by signal S21 and the control setting 353. Compensator function GC2-1 (such as a PID compensator) produces duty cycle control setting 333-1 (signals, information, etc.) supplied to modulator function 340 to modulate operation of the power converter phase 122-P1.

As further shown, summer 331-2 generates the error current signal 328-2 based on a difference between the magnitude of the output current 132-2 as indicated by signal S22 and the control setting 353. Compensator function GC2-2 (such as a PID compensator) produces duty cycle control setting 333-2 supplied to modulator function 340 to modulate operation of the power converter phase 122-P2.

As further shown, summer 331-N generates the error current signal 328-N based on a difference between the magnitude of the output current 132-N as indicated by signal S2N and the control setting 353. Compensator function GC2-N (such as a PID compensator) produces duty cycle control setting 333-N supplied to modulator function 340 to modulate operation of the power converter phase 122-PN.

Thus, in one embodiment, the controller 142 adjusts the magnitude of the output current 132 from the power converter 122 based at least in part on an average current consumed amongst the multiple dynamic loads 118-1, 118-2, 118-3, etc. In other words, it is shown that the controller 140 controls the multiple power converter phases 122 in the power supply to collectively produce the magnitude of the output current 132 to be the average of total current consumed amongst the multiple dynamic loads. Control operation also results in the signal 319 biasing towards zero.

As a more specific example of the control functionality provided by the controller 142 in FIG. 3, in order to maintain regulation, assume that the power system 100 includes three dynamic loads such as dynamic load 118-1, dynamic load 118-2, and dynamic load 118-3. As previously discussed, the dynamic loads 118 are disposed in series and are powered via power converter 121 and power converter 122.

In one example embodiment, at or around time T1, assume that the dynamic load 118-1 consumes (via a combination of output current 132+output current 131-1) a total of 20 amps, dynamic load 118-2 consumes (via output a combination of current 132+output current 131-2) a total of 20 amps, dynamic load 118-3 consumes (via a combination of output current 132+output current 131-3) a total of 20 amps. In such an instance, the power converter 122 produces the output current value 132 to be 20 amps [average of: a) total of 20 amps consumed by dynamic load 118-1, b) total of 20 amps consumed by dynamic load 118-2, c) total of 20 amps consumed by dynamic load 118-3]; while power converter 121-1 produces the output current 131-1 to be 0 amps; power converter 121-2 produces the output current 131-2 to be 0 amps; power converter 121-3 produces the output current 131-3 to be 0 amps.

At or around time T2, assume that the dynamic load 118-1 consumes (via a combination of output current 132+output current 131-1) a total of 130 amps, dynamic load 118-2 consumes (via output a combination of current 132+output current 131-2) a total of 20 amps, dynamic load 118-3 consumes (via a combination of output current 132+output current 131-3) a total of 20 amps. In such an instance, the power converter 122 produces the output current value 132 to be 56.6 amps [average of: a) total of 130 amps consumed by dynamic load 118-1, b) total of 20 amps consumed by dynamic load 118-2, c) total of 20 amps consumed by dynamic load 118-3]; while power converter 121-1 produces the output current 131-1 to be 73.4 amps; power converter 121-2 produces the output current 131-2 to be −36.6 amps; power converter 121-3 produces the output current 131-3 to be −36.6 amps.

At or around time T3, assume that the dynamic load 118-1 consumes (via a combination of output current 132+output current 131-1) a total of 130 amps, dynamic load 118-2 consumes (via output a combination of current 132+output current 131-2) a total of 130 amps, dynamic load 118-3 consumes (via a combination of output current 132+output current 131-3) a total of 20 amps. In such an instance, the power converter 122 produces the output current value 132 to be 93.3 amps [average of: a) total of 130 amps consumed by dynamic load 118-1, b) total of 130 amps consumed by dynamic load 118-2, c) total of 20 amps consumed by dynamic load 118-3]; while power converter 121-1 produces the output current 131-1 to be 36.6 amps; power converter 121-2 produces the output current 131-2 to be 36.6 amps; power converter 121-3 produces the output current 131-3 to be −73.3 amps.

At or around time T4, assume that the dynamic load 118-1 consumes (via a combination of output current 132+output current 131-1) a total of 130 amps, dynamic load 118-2 consumes (via output a combination of current 132+output current 131-2) a total of 130 amps, dynamic load 118-3 consumes (via a combination of output current 132+output current 131-3) a total of 130 amps. In such an instance, the power converter 122 produces the output current value 132 to be 130 amps [average of: a) total of 130 amps consumed by dynamic load 118-1, b) total of 130 amps consumed by dynamic load 118-2, c) total of 130 amps consumed by dynamic load 118-3]; while power converter 121-1 produces the output current 131-1 to be 0 amps; power converter 121-2 produces the output current 131-2 to be 0 amps; power converter 121-3 produces the output current 131-3 to be 0 amps.

Figure 4:
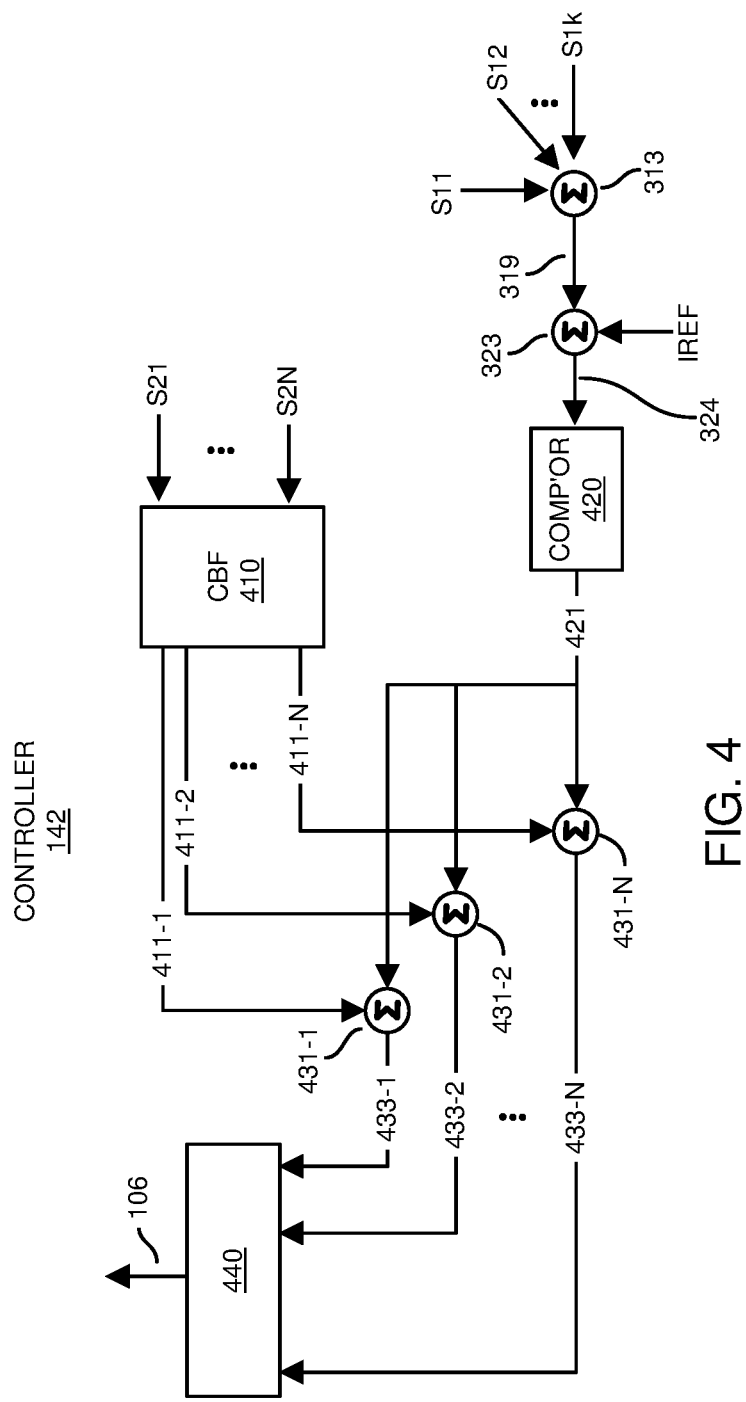
FIG. 4 is an example diagram illustrating implementation of a voltage mode control loop in a primary power converter according to embodiments herein.

FIG. 4 is an example diagram illustrating implementation of a voltage mode control loop in a main voltage regulator according to embodiments herein.

Still further example embodiments herein include, via the controller, operating in a voltage control mode to produce the output current.

In this example embodiment, as previously discussed, summer 313 sums a combination of the input signal S11 (representing the magnitude of the output current 131-1), input signal S12 (representing the magnitude of the output current 131-2), input signal S13 (representing the magnitude of the output current 131-3), . . . , input signal S1$k$ (representing the magnitude of the output current 131-$k$). The signal 319 produced by the summer 313 represents the summation of output current 131-1, output current, 131-2, output current 131-3, and so on.

Summer 323 sums signal 319 and reference current signal IREF to produce signal 324. In one embodiment, IREF=0 amps.

Via signal 324, compensator function 420 (such as a PID compensator) produces signal 421 representing a control setting used to regulate magnitudes of output current 132-1, 132-2, 132-3, etc., from the power converter phases of the power converter 122.

As its name suggests, the current balance function 410 balances current supplied by the power converter phases of the power converter 122. The current balance function 410 receives respective magnitudes of output current 132-1, 132-2, 132-3, etc., and produces respective duty cycle control information 411 associated with each of the power converter phases of power converter 122. For example, the current balance function 410 produces signal 411-1 associated with the power converter phase 122-P1; the current balance function 410 produces signal 411-2 associated with the power converter phase 122-P2; and so on.

Additionally, as further shown, the summer 431-1 sums the signal 411-1 and duty cycle signal 421 to produce duty cycle control signal 433-1 provided to the modulator function 440; the modulator function 440 uses the duty cycle control signal 433-1 to produce control signal 106-1 used to control the power converter phase 122-P1.

The summer 431-2 sums the signal 411-2 and duty cycle signal 421 to produce duty cycle control signal 433-2 provided to the modulator function 440; the modulator function 440 uses the duty cycle control signal 433-2 to produce control signal 106-2 used to control the power converter phase 122-P2.

The summer 431-N sums the signal 411-N and duty cycle signal 421 to produce duty cycle control signal 433-N provided to the modulator function 440; the modulator function 440 uses the duty cycle control signal 433-N to produce control signal 106-N used to control the power converter phase 122-PN.

Figure 5:
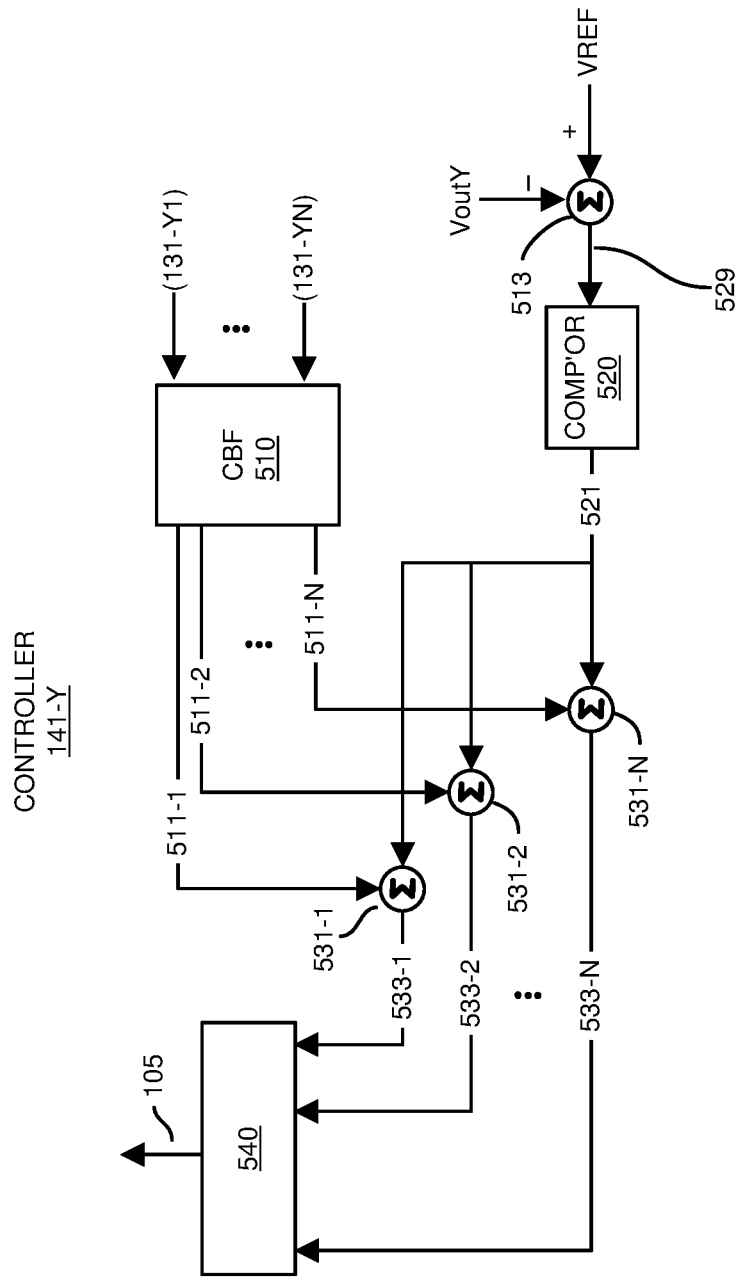
FIG. 5 is an example diagram illustrating implementation of a voltage mode control loop in a respective local voltage regulator according to embodiments herein.

FIG. 5 is an example diagram illustrating implementation of a voltage mode control loop in a local voltage regulator according to embodiments herein.

In this example embodiment, each of the power converters 121 implements a control function as shown in FIG. 5 to maintain a magnitude of the respective output voltage at a desired value. For example, summer 513 of the controller 141-Y receives VoutY and VREF and produces error voltage signal 529 based on a difference between the VREF and VoutY. Compensator function 520 (such as based on a PID) produces control signal 521 supplied to respective summers 531 (531-1, 531-2, and so on).

As its name suggests, the current balance function 510 balances current supplied by the power converter phases of the power converter 121-Y. The current balance function 510 receives respective magnitudes of output current 131-Y1, 131-Y2, 131-Y3, etc., and produces respective duty cycle control information 511 associated with each of the power converter phases of power converter 121-Y. For example, the current balance function 510 produces signal 511-1 associated with the power converter phase 121-PY1; the current balance function 510 produces signal 511-2 associated with the power converter phase 121-PY2; and so on.

As further shown, the summer 531-1 sums the signal 511-1 and duty cycle signal 521 to produce duty cycle control signal 533-1 provided to the modulator function 540; the modulator function 540 uses the duty cycle control signal 533-1 to produce control signal 105-1 used to control the power converter phase 121-PY1.

The summer 531-2 sums the signal 511-2 and duty cycle signal 521 to produce duty cycle control signal 533-2 provided to the modulator function 540; the modulator function 540 uses the duty cycle control signal 533-2 to produce control signal 105-2 used to control the power converter phase 121-PY2.

As further shown, the summer 531-3 sums the signal 511-3 and duty cycle signal 521 to produce duty cycle control signal 533-3 provided to the modulator function 540; the modulator function 540 uses the duty cycle control signal 533-3 to produce control signal 105-3 used to control the power converter phase 121-PY3.

Figure 6:
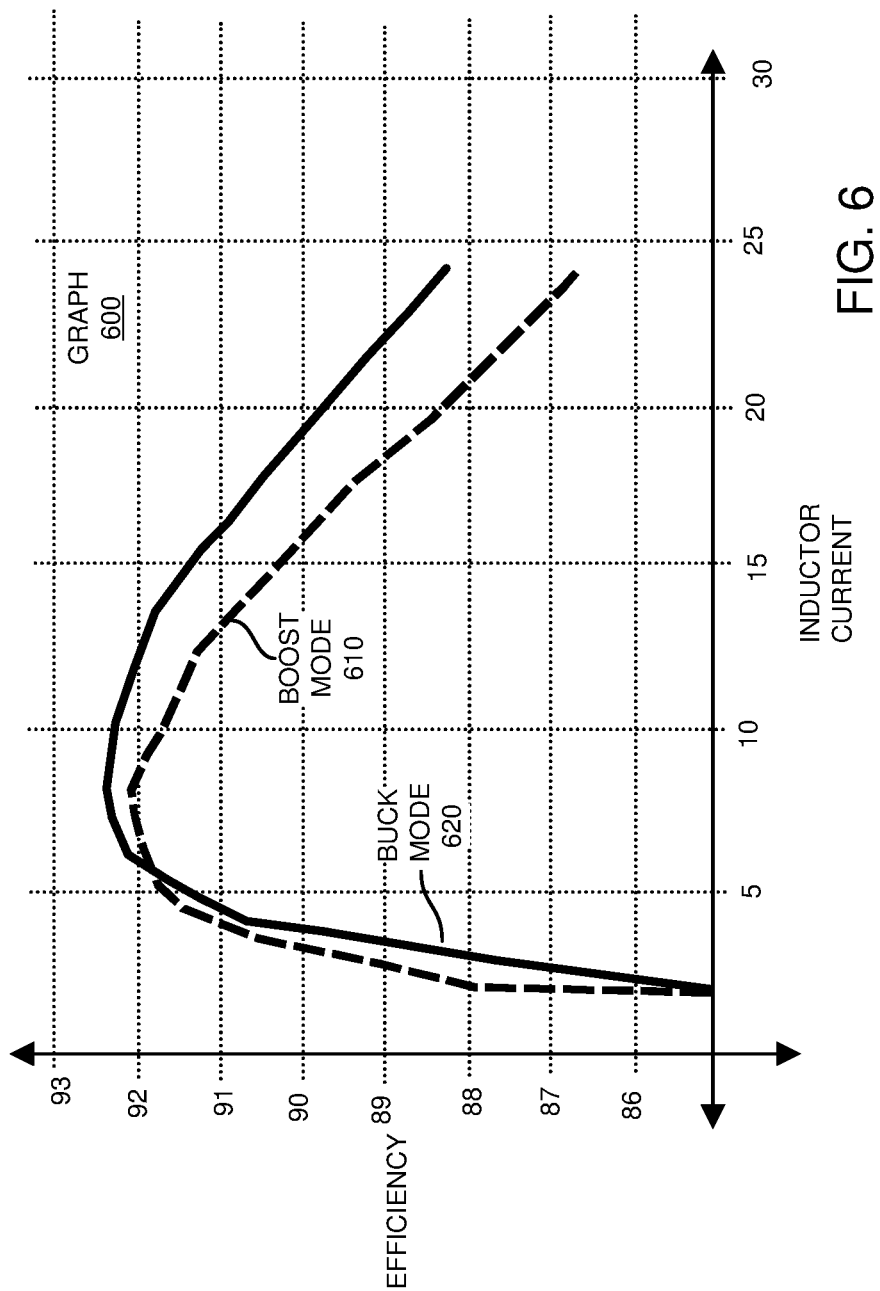
FIG. 6 is an example diagram illustrating different buck/boost current efficiency of operating power converter phases according to embodiments herein.

FIG. 6 is an example diagram illustrating different buck/boost current efficiency of operating power converter phases according to embodiments herein.

Graph 600 illustrates efficiency of operating a power converter phase with positive and negative current. In this example embodiment, positive current operation of the power converter phases incurs less loss and is therefore more efficient. Negative current operation is less efficient.

Based on graph 600, embodiments herein include choosing a non-zero value of IREF to improve efficiency of converting an input voltage to power the multiple dynamic loads 118. For example, setting of the current reference value IREF to 20 Amps causes the power converters to operate at a higher current level and more efficient buck operation (buck mode 620).

Figure 7:
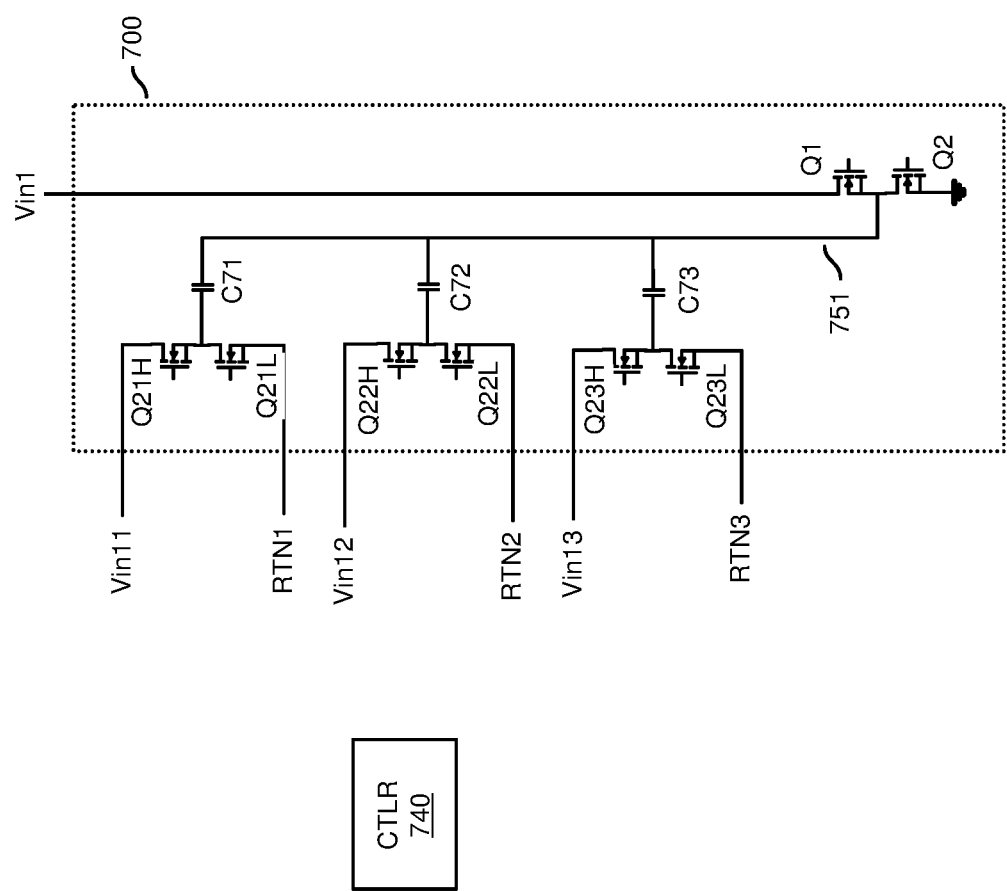
FIG. 7 is an example diagram illustrating implementation of a switched-capacitor, multiple-level voltage generator according to embodiments herein.

FIG. 7 is an example diagram illustrating implementation of a switched-capacitor, multiple-level voltage generator according to embodiments herein.

In this example embodiment, the power system 100 includes voltage generator 700 to produce voltage provided to the power converters 121. Controller 740 controls operation of the switches in the voltage generator 700.

For example, voltage generator 700 incudes switches Q1 and Q2 connected in series between the input voltage Vin1 (main input voltage) and ground. Operation of the switches Q1 and Q2 produces voltage signal 751 supplied to capacitors C71, C72, C73, etc. Switching of switches Q21H and Q21L via controller 740 results in generation of voltage Vin11 supplied to power converter 121-1; switching of switches Q22H and Q22L via controller 740 results in generation of voltage Vin12 supplied to power converter 121-2; switching of switches Q23H and Q23L via controller 740 results in generation of voltage Vin13 supplied to power converter 121-3; and so on.

Thus, embodiments herein include a voltage generator 700 to convert a main input voltage Vin1 into multiple output voltages Vin11, Vin12, Vin13, etc., used to power the respective power converters 121. For example, in one embodiment, the voltage generator converts the input voltage Vin1 into multiple level shifted supply voltages (Vin11, Vin12, Vin13, etc.), each of which powers a corresponding power converter controlling a voltage across a respective dynamic load of the multiple dynamic loads 118.

Figure 8:
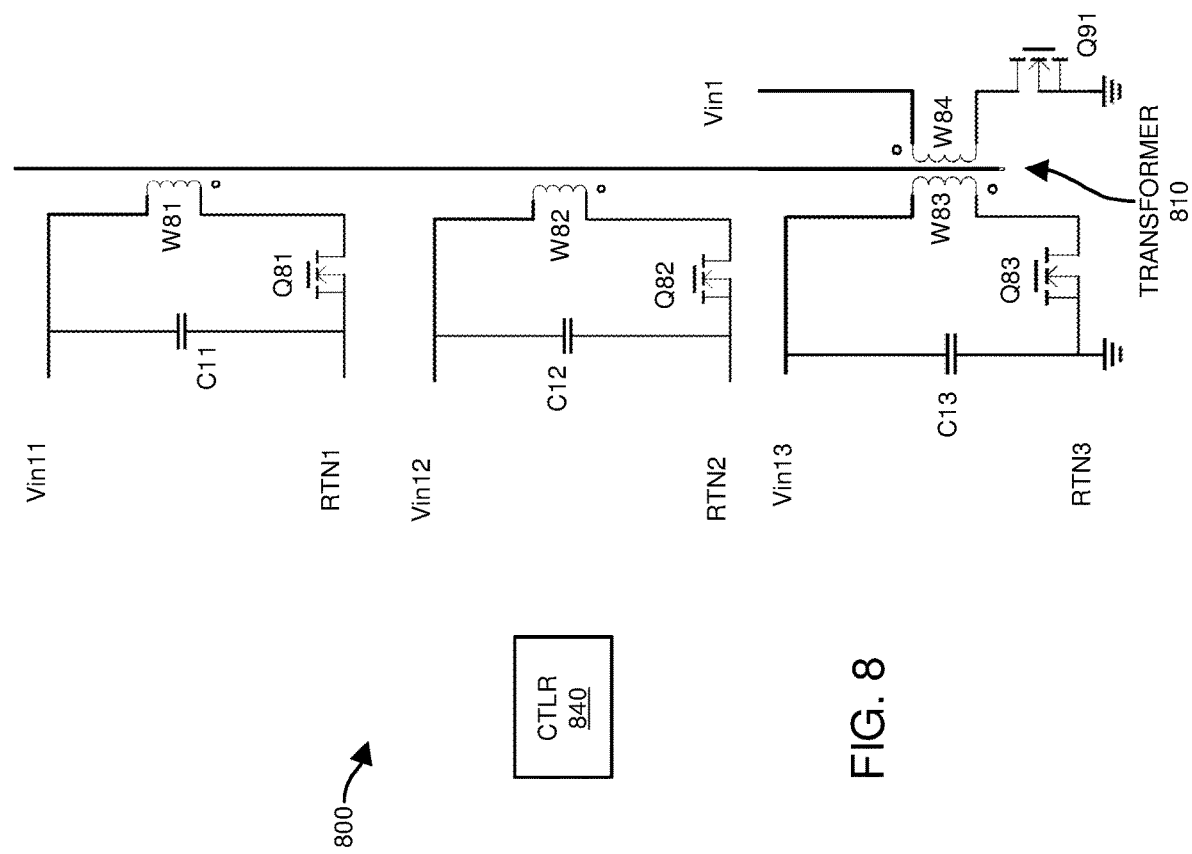
FIG. 8 is an example diagram illustrating implementation of a bidirectional multiple-level voltage flyback power converter according to embodiments herein.

FIG. 8 is an example diagram illustrating implementation of a bidirectional multiple-winding flyback power converter according to embodiments herein.

In this example embodiment, the power management system of producing voltage Vin11, Vin12, Vin13, etc., as discussed herein includes a flyback voltage converter 800 including capacitors C11, C12, C13, switch Q91, switches Q81, Q82, Q83, and transformer 810. Transformer 810 includes windings W81, W82, W83 magnetically couple to each other and winding W84 as shown.

Via switching of switches Q81, Q82, Q83, and Q91 controlled by controller 840, the flyback voltage converter 800 converts an input voltage Vin1 into multiple level shifted supply voltages Vin11, Vin12, Vin13, each of which powers a corresponding power converter 121. As previously discussed, the power converters 121 control a corresponding voltage across a respective dynamic load of the multiple dynamic loads.

Figure 9:
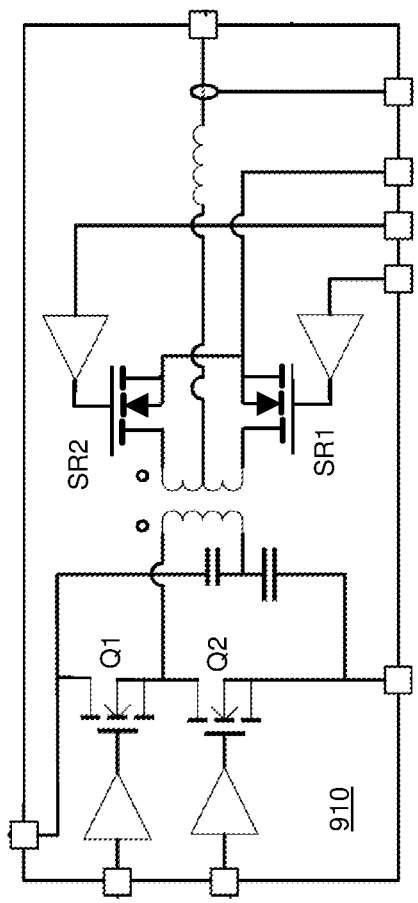
FIG. 9 is an example diagram illustrating implementation of a power converter according to embodiments herein.

FIG. 9 is an example diagram illustrating implementation of a power converter according to embodiments herein.

As an alternative to implementing a respective buck converter, embodiments herein include implementing each of one or more power converter phases as discussed herein via power converter 910.

Figure 10:
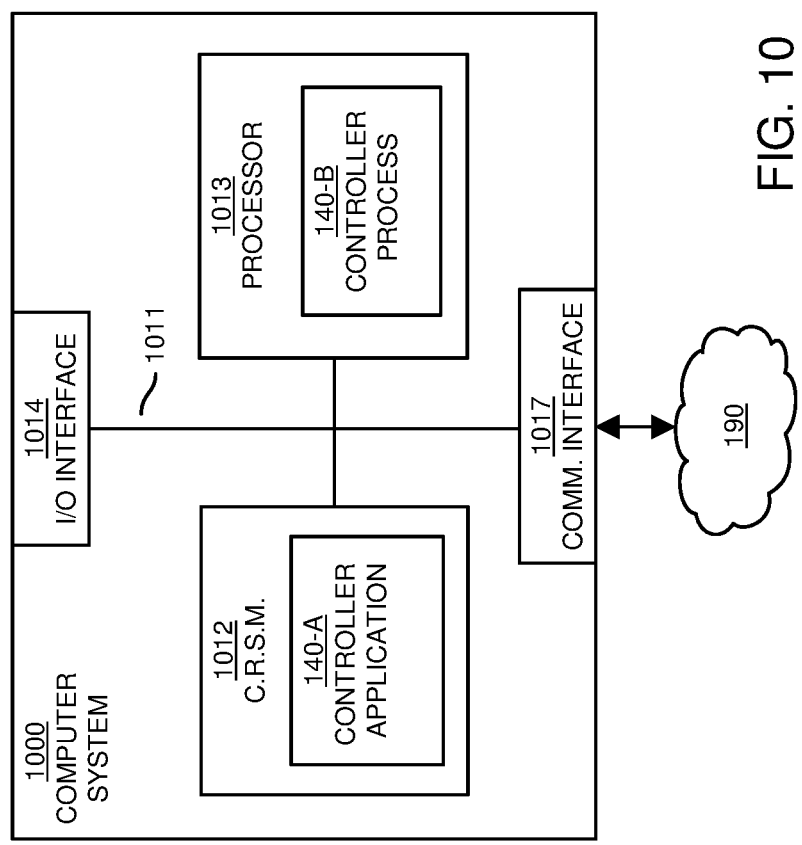
FIG. 10 is an example diagram illustrating computer processor hardware and related software instructions that execute methods according to embodiments herein.

FIG. 10 is an example block diagram of a computer device for implementing any of the operations as discussed herein according to embodiments herein.

As shown, computer system 1000 (such as implemented by any of one or more resources such as each of controllers, power converters, etc.) of the present example includes an interconnect 1011 that couples computer readable storage media 1012 such as a non-transitory type of media (or hardware storage media) in which digital information can be stored and retrieved, a processor 1013 (e.g., computer processor hardware such as one or more processor devices), I/O interface 1014 (e.g., to output control signals to the power converter phases, monitor current, etc.), and a communications interface 1017.

I/O interface 1014 provides connectivity to any suitable circuitry such as power converter phases.

Computer readable storage medium 1012 can be any hardware storage resource or device such as memory, optical storage, hard drive, floppy disk, etc. In one embodiment, the computer readable storage medium 1012 stores instructions and/or data used by the controller application 140-A (such as implemented by any of controllers 141-1, 141-2, 141-3, . . . , 142, etc.) to perform any of the operations as described herein.

Further in this example embodiment, communications interface 1017 enables the computer system 1000 and processor 1013 to communicate over a resource such as network 190 to retrieve information from remote sources and communicate with other computers.

As shown, computer readable storage media 1012 is encoded with controller application 140-A (e.g., software, firmware, etc.) executed by processor 1013. Controller application 140-A can be configured to include instructions to implement any of the operations as discussed herein.

During operation of one embodiment, processor 1013 accesses computer readable storage media 1012 via the use of interconnect 1011 in order to launch, run, execute, interpret or otherwise perform the instructions in controller application 140-A stored on computer readable storage medium 1012.

Execution of the controller application 140-A produces processing functionality such as controller process 140-B in processor 1013. In other words, the controller process 140-B associated with processor 1013 represents one or more aspects of executing controller application 140-A within or upon the processor 1013 in the computer system 1000.

In accordance with different embodiments, note that computer system 1000 can be a micro-controller device, logic, hardware processor, hybrid analog/digital circuitry, etc., configured to control a power supply and perform any of the operations as described herein.

Functionality supported by the different resources will now be discussed via flowchart in FIG. 11. Note that the steps in the flowcharts below can be executed in any suitable order.

Figure 11:
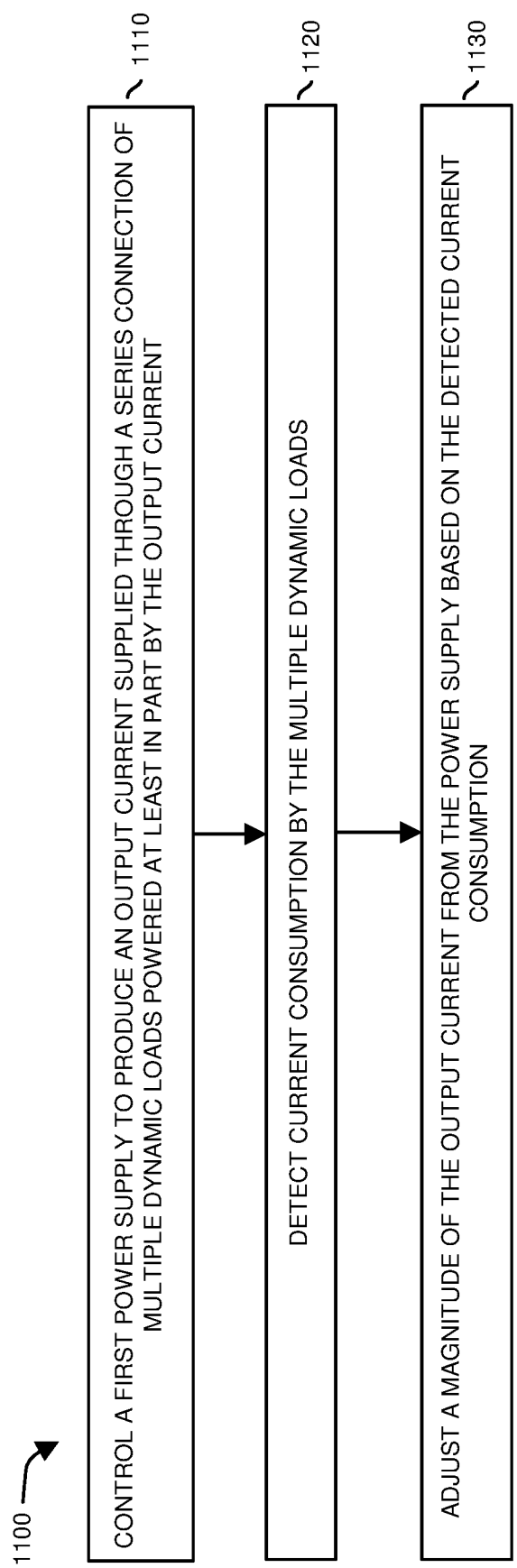
FIG. 11 is an example diagram illustrating a method according to embodiments herein.

FIG. 11 is an example diagram illustrating a method of controlling a power converter according to embodiments herein.

In processing operation 1110, the controller 142 controls power converter 122 and corresponding phases to produce an output current 132 supplied through a series connection of multiple dynamic loads 118 each of which is powered at least in part by the output current 132.

In processing operation 1120, the controller 142 detects current consumption (such as output current 131-1, 131-2, 131-3, etc.) by the multiple dynamic loads 118.

In processing operation 1130, the controller 142 adjusts a magnitude of the output current 132 produced by the power converter 122 based on the detected current consumption by the dynamic loads 118.

Figure 12:
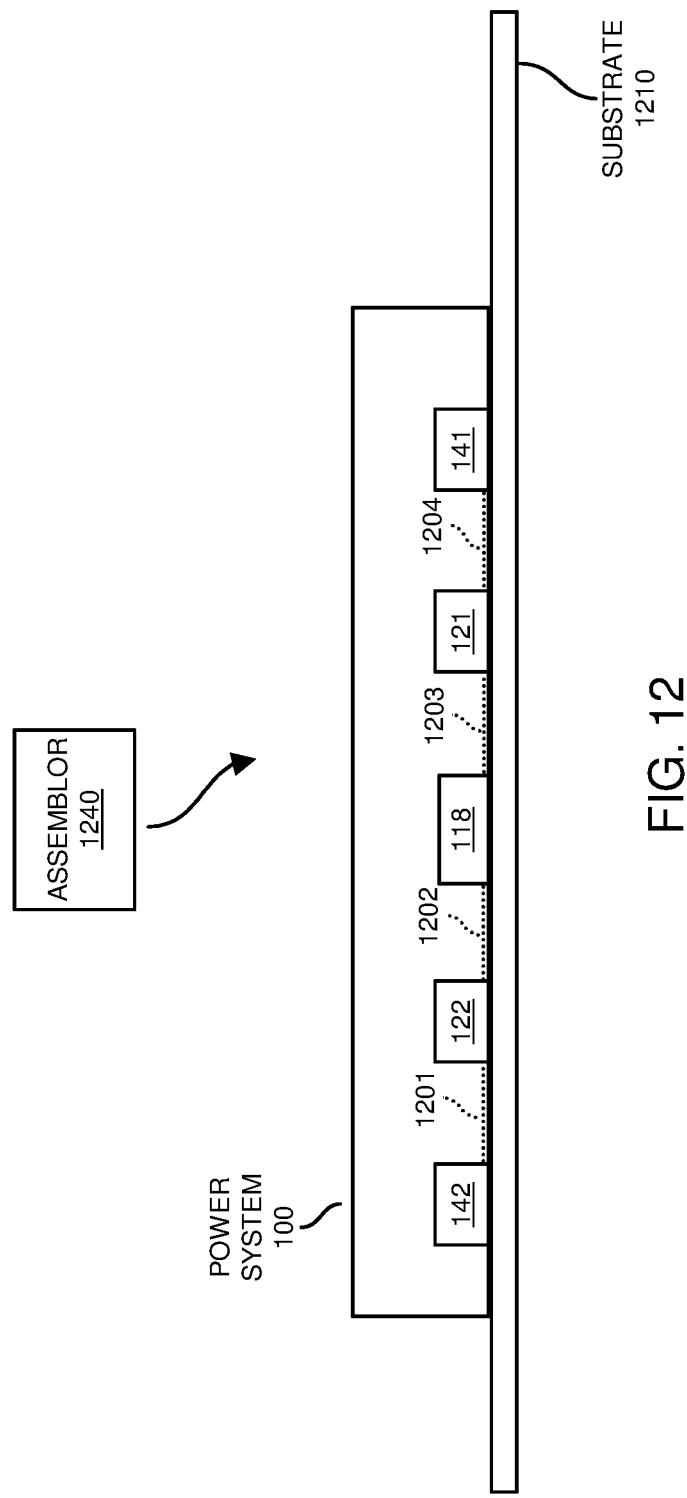
FIG. 12 is an example diagram illustrating assembly of a circuit according to embodiments herein.

FIG. 12 is an example diagram illustrating assembly of a power supply and multiple interconnected power converter phases on a circuit board according to embodiments herein.

In this example embodiment, assembler 1240 receives a substrate 1210 and corresponding components of power system 100 in which to affix one or more components such as controllers 141, power converters 121, controller 142, power converter 122, and dynamic loads 118, etc. The assembler 1240 affixes (couples) each of these circuits, etc., onto the substrate 1210.

Via respective circuit paths 1201, 1202, 1203, 1204, etc., as described herein, the assembler 1240 provides connectivity between a respective controller and power converter and dynamic loads 118.

Note that components such as associated with the power converters, controllers, etc., can be affixed or coupled to the substrate 1210 in any suitable manner. For example, one or more of the components associated with the power converters 121, power converter 122, controllers 141, controller 142, dynamic loads 118, etc., can be soldered to the substrate 1210, inserted into sockets disposed on the substrate 1210, etc.

Note further that the substrate 1210 is optional. Any of one or more circuit paths or connectivity as shown in the drawings and as described herein can be disposed in cables or other suitable medium.

In one nonlimiting example embodiment, one or more of the controllers, power converters, dynamic loads, etc., are disposed on their own substrate independent of substrate 1210; the substrate of the dynamic load 118 is directly or indirectly connected to the substrate 1210 via wires, cables, links, etc. The power converters or any portion of the power supply controller and corresponding power converter phases as well as any other components as discussed herein can be disposed on a standalone smaller board plugged into a socket of the substrate 1210 as well.

As previously discussed, via one or more circuit paths 1201 and 1204, (such as one or more traces, cables, connectors, wires, conductors, electrically conductive paths, etc.), the assembler 1240 couples the respective controllers and power converters. The circuit paths 1202 and 1203 provide connectivity between the power converters and the dynamic loads 118.

Accordingly, embodiments herein include a system comprising: a substrate 1210 (such as a circuit board, standalone board, mother board, standalone board destined to be coupled to a mother board, host, etc.); power converters 121, 122, etc., including corresponding components as described herein; and controllers 141, 142.

Note again that each of the loads 118 or collection of dynamic loads can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1210 or disposed at a remote location.

Note again that techniques herein are well suited for use in circuit applications such as those that implement generation of an output current to power a series connection of multiple dynamic loads 118. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   a controller operative to:
      control a first power converter to produce an output current supplied through a series connection of multiple dynamic loads powered at least in part by the output current;
      monitor current consumption by the multiple dynamic loads; and
      adjust a magnitude of the output current from the first power converter based on the monitored current consumption.

2. The apparatus as in claim 1, wherein the controller is further operative to adjust the magnitude of the output current from the first power converter based at least in part on an average current consumed by each of the multiple dynamic loads.

3. The apparatus as in claim 2, wherein the controller is further operative to:
   control multiple power converter phases in the first power converter to collectively produce the magnitude of the output current to be the average current consumed amongst the multiple dynamic loads.

4. The apparatus as in claim 1, wherein a respective voltage across each of the multiple dynamic loads is regulated via a corresponding voltage regulator.

5. The apparatus as in claim 4, wherein the controller is further operative to:
monitor a magnitude of corresponding current supplied by each of the corresponding voltage regulators to a respective dynamic load;
derive an aggregate current value based on the magnitudes of corresponding current; and
utilize the aggregate current value to produce a reference current setting.

6. The apparatus as in claim 5, wherein the controller is further operative to:
regulate the output current supplied by the first power converter to the dynamic loads based on the reference current setting.

7. The apparatus as in claim 1, wherein the controller is further operative to:
operate in a current control mode to produce the output current.

8. The apparatus as in claim 1, wherein the controller is further operative to:
operate in a voltage control mode to produce the output current.

9. The apparatus as in claim 1, wherein the controller is further operative to:
control multiple power converter phases of the first power converter such that a summation of output current supplied by voltage regulators to the dynamic loads is equal to a reference current setting.

10. The apparatus as in claim 9, wherein the reference current setting is a non-zero value.

11. The apparatus as in claim 9, wherein a magnitude of the reference current setting is chosen to control a buck/boost efficiency of respective power converters implemented to power the multiple dynamic loads.

12. The apparatus as in claim 1 further comprising:
a voltage converter operative to convert an input voltage into multiple level shifted supply voltages, each of which powers a corresponding secondary power converter controlling a voltage across a respective dynamic load of the multiple dynamic loads; and
wherein the voltage converter includes a DC transformer operative to produce the multiple level shifted supply voltages.

13. The apparatus as in claim 1 further comprising:
a voltage converter operative to convert an input voltage into multiple level shifted supply voltages, each of which powers a corresponding secondary power converter controlling a voltage across a respective dynamic load of the multiple dynamic loads; and
wherein the voltage converter is a switched capacitor level shifter power converter operative to produce the multiple level shifted supply voltages.

14. The apparatus as in claim 1 further comprising:
a flyback voltage converter operative to convert an input voltage into multiple level shifted supply voltages, each of which powers a corresponding secondary power converter controlling a corresponding voltage across a respective dynamic load of the multiple dynamic loads.

15. A system comprising:
a circuit substrate; and
the apparatus of claim 1, the apparatus coupled to the circuit substrate.

16. A method comprising:
receiving a circuit substrate; and
coupling the apparatus of claim 1 to the circuit substrate.

17. A method comprising:
controlling a first power converter to produce an output current supplied through a series connection of multiple dynamic loads powered at least in part by the output current;
monitoring current consumption by the multiple dynamic loads; and
adjusting a magnitude of the output current from the first power converter based on the monitored current consumption.

18. The method as in claim 17 further comprising:
adjusting the magnitude of the output current from the first power converter based at least in part on an average current consumed by each of the multiple dynamic loads.

19. The method as in claim 17 further comprising:
controlling multiple power converter phases in the first power converter to collectively produce the magnitude of the output current to be the average current consumed amongst the multiple dynamic loads.

20. The method as in claim 17, wherein a respective voltage across each of the multiple dynamic loads is regulated via a corresponding voltage regulator.

21. The method as in claim 20 further comprising:
monitor a magnitude of corresponding current supplied by each of the corresponding voltage regulators to a respective dynamic load;
derive an aggregate current value based on the magnitudes of corresponding current; and
utilize the aggregate current value to produce a reference current setting.

22. The method as in claim 21 further comprising:
regulating the output current supplied by the first power converter to the dynamic loads based on the reference current setting.

23. The method as in claim 17 further comprising:
operating in a current control mode to produce the output current.

24. The method as in claim 17 further comprising:
operating in a voltage control mode to produce the output current.

25. The method as in claim 17 further comprising:
controlling multiple power converter phases of the first power converter such that a summation of output current supplied by voltage regulators to the dynamic loads is equal to a reference current setting.

26. The method as in claim 25, wherein the reference current setting is a non-zero value.

27. The method as in claim 25, wherein a magnitude of the reference current setting is chosen to control a buck/boost efficiency of respective power converters implemented to power the multiple dynamic loads.

28. The method as in claim 17 further comprising:
via a voltage converter, converting an input voltage into multiple level shifted supply voltages, each of which powers a corresponding secondary power converter controlling a voltage across a respective dynamic load of the multiple dynamic loads; and
wherein the voltage converter includes a DC transformer operative to produce the multiple level shifted supply voltages.

29. The method as in claim 17 further comprising:
via a voltage converter, converting an input voltage into multiple level shifted supply voltages, each of which powers a corresponding secondary power converter controlling a voltage across a respective dynamic load of the multiple dynamic loads; and wherein the voltage converter is a switched capacitor level shifter power converter operative to produce the multiple level shifted supply voltages.

30. The method as in claim 17 further comprising:
via a flyback voltage converter, converting an input voltage into multiple level shifted supply voltages, each of which powers a corresponding secondary power converter controlling a corresponding voltage across a respective dynamic load of the multiple dynamic loads.

31. Computer-readable storage hardware having instructions stored thereon, the instructions, when executed by computer processor hardware, cause the computer processor hardware to:
control a first power supply to produce an output current supplied through a series connection of multiple dynamic loads powered at least in part by the output current;
monitor current consumption by each of the multiple dynamic loads; and
adjust a magnitude of the output current from the power supply based on the detected current consumption.

\* \* \* \* \*